US 6,684,351 B1

United States Patent
Bendak et al.

(10) Patent No.: US 6,684,351 B1
(45) Date of Patent: Jan. 27, 2004

(54) SYSTEM AND METHOD FOR DIAGNOSING ERRORS IN MULTIDIMENSIONAL DIGITAL FRAME STRUCTURE COMMUNICATIONS

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 449 days.

(21) Appl. No.: 09/746,488

(22) Filed: Dec. 22, 2000

(51) Int. Cl.[7] .................................. H04L 1/24
(52) U.S. Cl. .................. 714/715; 714/728; 714/739
(58) Field of Search ........................ 714/715–716, 714/728, 735, 738–739

(56) References Cited

U.S. PATENT DOCUMENTS

| 5,251,205 A | | 10/1993 | Callon et al. |
| 5,351,232 A | * | 9/1994 | Yamashita .................. 370/248 |
| 5,490,252 A | | 2/1996 | Macera et al. |
| 5,568,471 A | | 10/1996 | Hershey et al. |
| 5,661,763 A | | 8/1997 | Sands |
| 5,666,108 A | | 9/1997 | Duffy |
| 5,778,000 A | | 7/1998 | Dosiere et al. |
| 5,793,976 A | | 8/1998 | Chen et al. |
| 5,854,699 A | | 12/1998 | Olshansky |
| 5,875,396 A | | 2/1999 | Stockton et al. |
| 5,982,743 A | | 11/1999 | Kusano |
| 6,006,069 A | | 12/1999 | Langston |

FOREIGN PATENT DOCUMENTS

| EP | 0849972 A | * | 6/1998 | ............. H04J/3/14 |
| JP | 03158044 A | * | 7/1991 | ............ H04L/29/14 |
| JP | 04144433 A | * | 5/1992 | ............. H04J/3/14 |
| JP | 04144434 A | * | 5/1992 | ............. H04J/3/14 |
| JP | 05252550 A | * | 9/1993 | ............ H04Q/3/52 |

* cited by examiner

*Primary Examiner*—R. Stephen Dildine
(74) *Attorney, Agent, or Firm*—Incaplaw; Terrance A. Meador

(57) ABSTRACT

A system and method is provided for in situ testing of communications links employing digitally wrapped communications. Portions of the payload to be wrapped are replaced with test patterns. These test patterns can be sent simultaneously with real information. The invention provides that the receiving node generate a test pattern, extract the transmitted test pattern, and determine errors in response to comparing the two test patterns. Analysis of the errors can be used to determine the state of the link between the transmitting and receiving nodes.

31 Claims, 4 Drawing Sheets

SYSTEM AND METHOD FOR DIAGNOSING ERRORS IN MULTIDIMENSIONAL DIGITAL FRAME STRUCTURE COMMUNICATIONS

BACKGROUND OF THE INVENTION

1. Field of the Invention

This invention is related generally to network linkage diagnostic testing and, more particularly, to a system and method for using sections of a digitally wrapped communication to provide an added function of in situ inter-link testing.

2. Description of the Related Art

Bit error rate testers (BERTs) are commonly used to diagnose and determine the performance of almost any kind of communication link. They do this by generating pseudo-random test patterns and then analyzing those patterns for various problems such as bit errors, synchronization losses, and pattern slips. Unfortunately, these testers require that the normal traffic flow be interrupted, and the system rewired to inject the signal from the BERT. There is no standard practice for performing BERT analysis for data in a variable rate FEC system implementing a multiple row, byte-interleaved, multi-frame superframe structure at high speeds.

It would be advantageous if links tests could be performed without interrupting the normal communication flow.

It would be advantageous if BERT could be performed simultaneously with the transfer of normal communications.

It would be advantageous if a digitally wrapped communication format could accommodate a testing process, in addition to the normal communication process.

SUMMARY OF THE INVENTION

Accordingly, an integrated circuit (IC) relay device is presented that provides for a built-in error injection/analysis for the purpose of diagnosing fiber optic links between nodes. The analysis is performed without the necessity of using special test equipment or physically reconfiguring the network. The IC relay programmable features permit a network administrator to inject known patterns into the optical network and remotely analyze the results to determine the performance of the communication link. This performance testing can be done with only a slight reduction in data carrying capacity, and without interrupting the normal flow of traffic.

The IC relay performs the following functions:

PRBS (pseudo-random bit sequence) pattern injection into any or all subframes of a frame;

programmable PRBS pattern selection including user programmable patterns;

programmable error injection into any or all of the subframes, including the selection of which bytes are corrupted, and how they are corrupted; and PRBS Pattern analysis on the decode side to gather error statistics on any or all of the subframes.

Critically, a network's bit error rate performance can be measured while it is in service. This function is performed by incorporating the BERT into the IC relay invention and making the subframes affected by the BERT programmable.

A method is also provided for diagnosing errors in multidimensional digital frame structure communications. The method comprises: defining a plurality of sub-sections in each frame; from the plurality of sub-sections, selecting a first sub-section; inserting test patterns into the first sub-section; transmitting the frame from a first node; receiving the frame at a second node; and, extracting the test pattern from the first sub-section. Further details of the BERT method and IC relay are provide below.

DETAILED DESCRIPTION OF THE PREFERRED EMBODIMENTS

Figure 1:
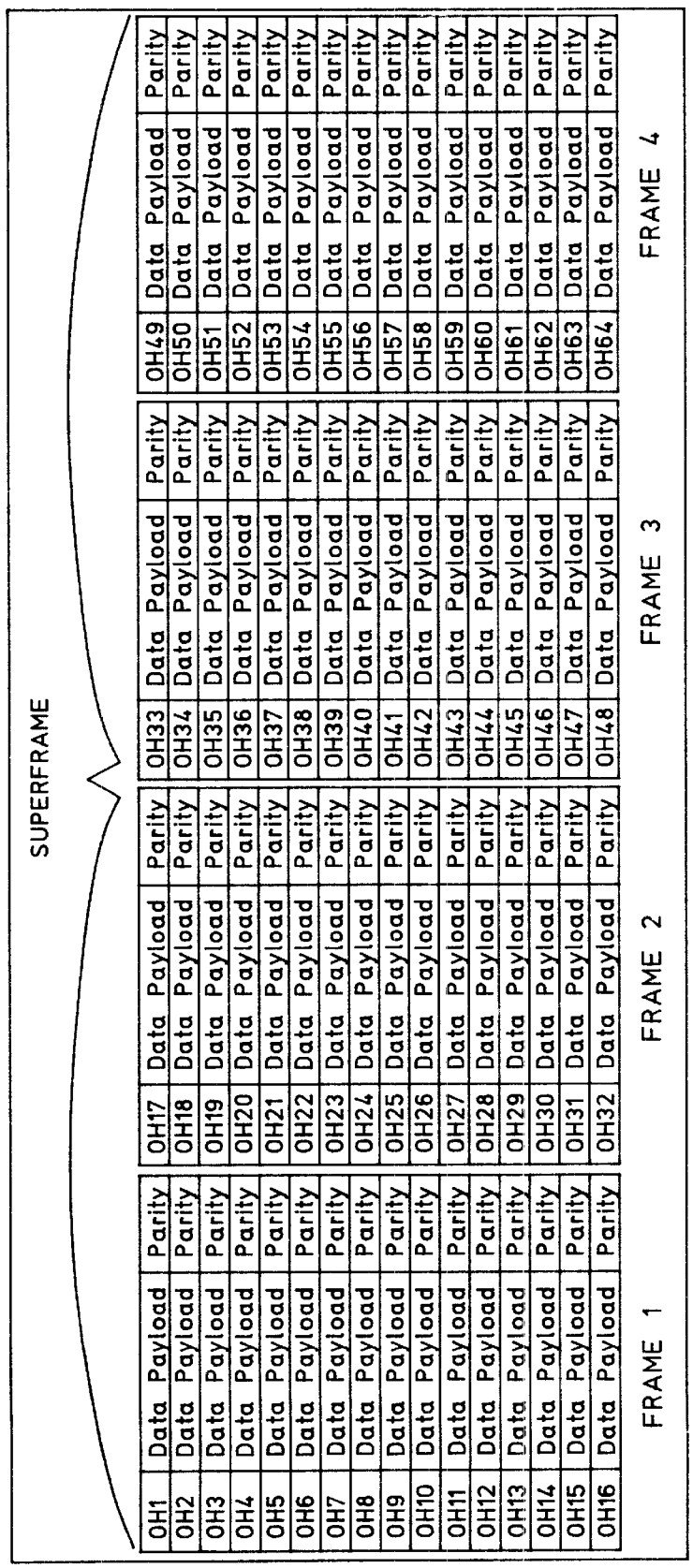
FIG. 1 is diagram illustrating a four-frame superframe structure digital wrapper.

FIG. 1 is diagram illustrating a four-frame superframe structure digital wrapper. The structure contains 16 subframes per frame, where each subframe consists of overhead, data payload, and parity bytes. The invention permits the data payload field to be replaced in any number of subframes, within a frame, with a programmable 16-bit sequence or a user selectable pseudo-random pattern as described in the following paragraphs. Although a four-frame, sixteen deep, superframe is described with a particular arrangement of overhead (OH), payload, and forward error correction (FEC) sections, the present invention is not limited to any particular frame structure.

As can be seen from examining Frame 1, each frame is considered to be multidimensional because it includes a plurality of rows, where each row includes an overhead byte, payload bytes, and parity (FEC) bytes. The present invention is not limited to any particular quantity of bytes to the overhead, payload, and FEC sections, or to any particular number of rows. The multidimensional frame structure is also referred to as a digital wrapper.

Figure 2:
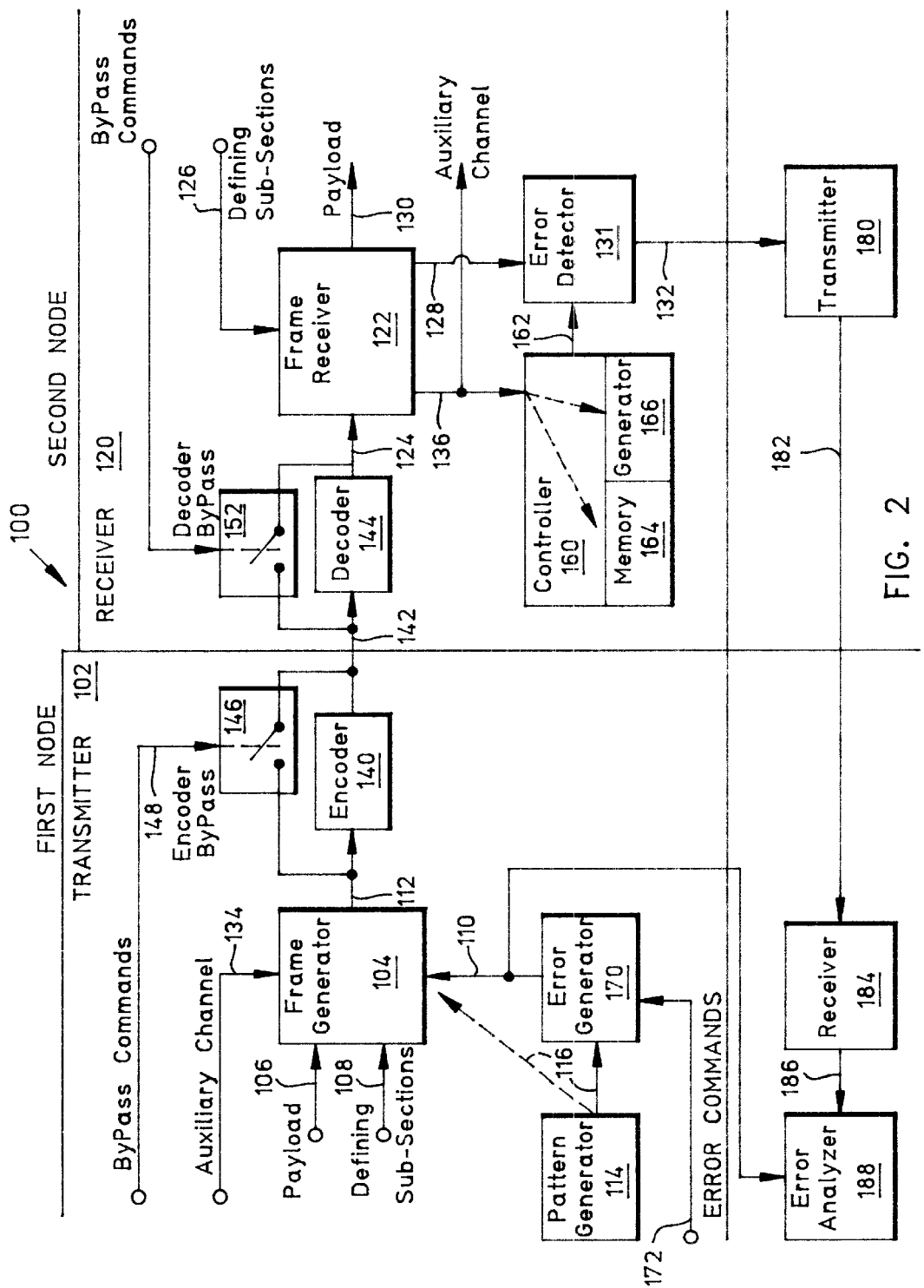
FIG. 2 is a schematic block diagram of a system using the IC relay device of the present invention for diagnosing errors in multidimensional digital frame structure communications.

FIG. 2 is a schematic block diagram of a system using the IC relay device of the present invention for diagnosing errors in multidimensional digital frame structure communications. The system 100 comprises a first node transmitter 102 including a frame generator 104 having a first input on line 106 to accept a payload. The frame generator 104 has a second input on line 108 to accept commands for defining a first sub-section from a plurality of sub-sections in each frame and a third input on line 110 to accept a test pattern for insertion into the first sub-section. The frame generator 104 has an output on line 112 to supply the frame. The transmitter 102 also includes a pattern generator 114 having an output on line 116 connected to the frame generator third input to supply the test pattern.

Figure 3:
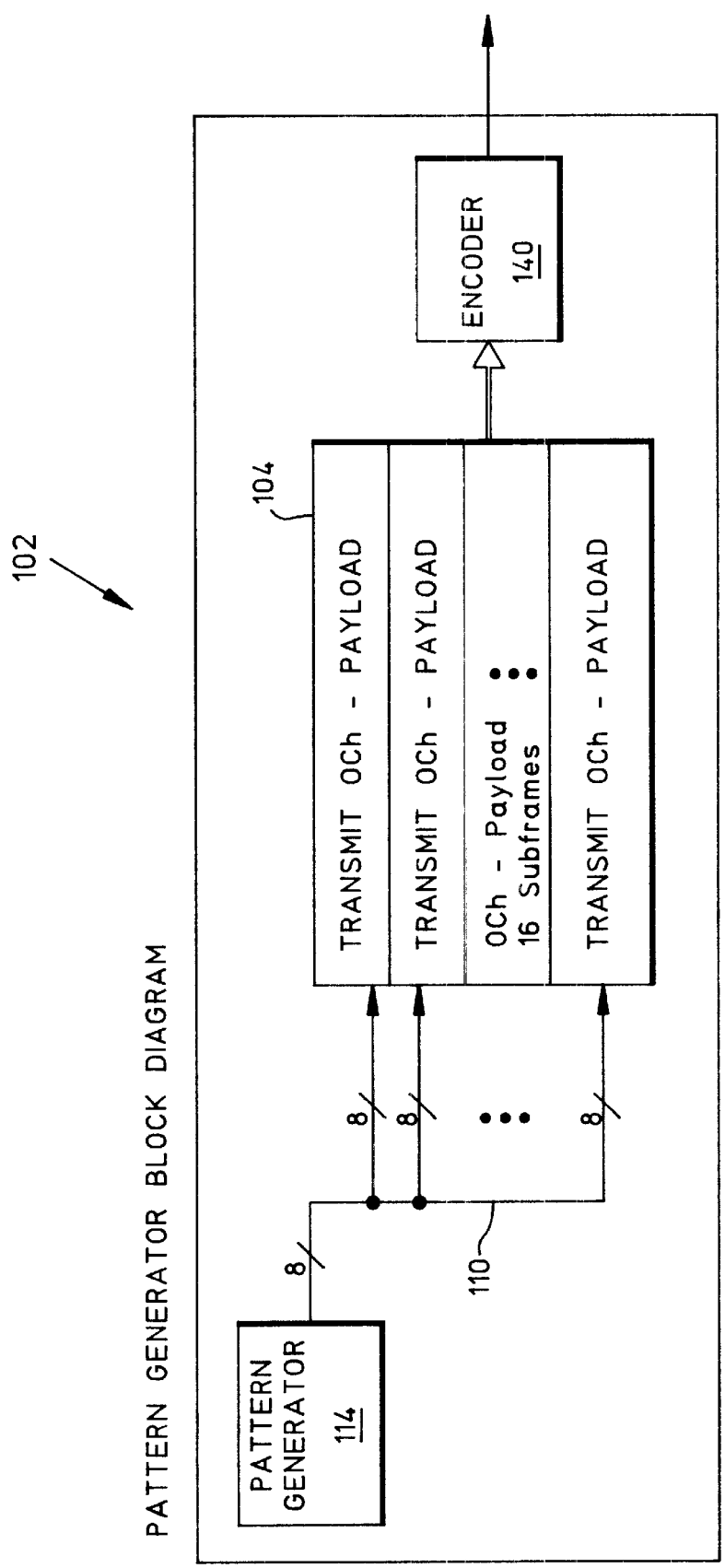
FIG. 3 is a simplified schematic illustrating the insertion of test patterns into the first sub-section of a frame.

FIG. 3 is a simplified schematic illustrating the insertion of test patterns into the first sub-section of a frame. In one aspect of the invention, the pattern generator 114 is a pseudo-random pattern generator conforming to ITU Specification 0.151. The pattern generator 114 may be programmed to send out a 16-bit user-defined pattern, or a pseudo-random pattern of $2^7-1$, $2^{15}-1$, $2^{23}-1$, and a $2^{31}-1$. When the pattern generator 114 is enabled, the payload in the selected subframes is overwritten with the pseudo-random pattern. A single pattern generator could output the same data on all 16 FEC subframes in a FEC frame.

The system 100 also comprises a second node receiver 120 including a frame receiver 122 having a first input on line 124 to accept the frame from the first node transmitter 102. The frame receiver 122 has a second input on line 126 to accept commands for defining a first sub-section from a plurality of sub-sections in each frame, a first output on line 128 to supply the test pattern extracted from the first sub-section, and a second output on line 130 to supply the payload. The receiver 120 also includes an error detector 131 having a first input on line 128 connected to the frame receiver first output, and an output on line 132 to supply a determination of errors in the extracted test pattern.

The frame generator second input (line 108) accepts commands to define a second sub-section from the plurality of frame sub-sections. The frame generator 104 has a fourth input on line 134 to accept communication data for insertion into the second sub-section. Likewise, the frame receiver second input on line 126 accepts commands to define the second-section. The frame receiver 122 has a fourth output on line 136 to supply the communication data extracted from the second sub-section.

Returning briefly to FIG. 1, it can be seen that each frame includes a plurality of rows, sixteen are shown, with each row including a payload section. The frame generator 104 and frame receiver 122 define a first sub-section as a plurality of row payload sections. It can also be seen in FIG. 1 that each row payload section includes a plurality of bytes. The frame generator 104 and frame receiver 122 accept commands to define a first sub-section as a plurality of bytes in a row payload section. Alternately stated, the first sub-section can be a single byte in the payload section of a single row. It can be a plurality of bytes in that row, or the entire payload section of that row. Further, the first sub-section can be either partial, or complete payload sections across the span of a plurality of rows, or even across the span of multiple frames or parts of frames.

Returning to FIG. 2, the first node transmitter 102 further includes an encoder 140 having an input on line 112 connected to the frame generator output, and an output on line 142 to supply a frame encoded with forward error protection. Likewise, the second node receiver 120 further includes a decoder 144 having an input on line 142 to receive the frame from the first node transmitter 102 and an output on line 124 connected to the first input of the frame receiver to supply a frame decoded with forward error corrections.

The first node transmitter 102 further includes an encoder bypass system 146 having a first input connected to the frame generator output on line 112, a second input to accept bypass commands on line 148, and an output to selectively supply frame sub-sections bypassing the encoder 140 on line 142, in response to the bypass commands. Likewise, the second node receiver 120 further includes a decoder bypass system 152 having a first input on line 142 to receive the frame from the first node transmitter 102, a second input to accept bypass commands on line 154, and an output connected to the frame receiver first input on line 124 to selectively supply frame sub-sections bypassing the decoder 144, in response to the bypass commands.

The auxiliary communication channels can be used for many inter-node functions, such as maintenance. In addition, the channel can be used to transfer test pattern generation information. The frame generator fourth input accepts test pattern keys 134 for insertion into the second sub-section. The key corresponds to the pattern being generated by pattern generator 114. The frame receiver fourth output supplies test pattern keys extracted from the second subsection on line 136. The second node receiver 120 further includes a controller 160 having an input connected to the frame receiver fourth output on line 136 to accept the tests pattern keys. The controller 160 has an output on line 162 to supply a formed test pattern. The error detector 131 has a second input connected to the controller output on line 162 to accept the formed test pattern. The error detector 131 compares the formed test pattern to the extracted test pattern to determine errors.

In one aspect of the invention, the controller 160 includes a memory with a plurality of test patterns. The controller 160 accesses a test pattern in memory 164 in response to receiving the test pattern key on line 136, to supply the formed test pattern. Alternately, the controller 160 includes a pattern generator 166. The controller 160 uses the generator 166 to generate a test pattern in response to receiving the test pattern key on line 136, to supply the formed test pattern. In another alternative, the entire test pattern is received from auxiliary channel communications. In some aspects of the invention not shown, the second node receiver 120 receives auxiliary communications external to the system 100.

The first node transmitter 102 further includes an error generator 170 having an input connected to the output of the pattern generator 114 on line 116. The error generator 170 has a second input to accept error commands on line 172, and an output connected to the third input of the frame generator on line 110 to supply a test pattern with predetermined errors. In some aspects of the invention, the error generator 170 is not present, or it is selectably connectable as represented by the dotted line directly connecting the pattern generator 114 to the frame generator 104. The error generator 170 accepts commands to selectively control the location, value, quantity, and distribution of the errors in the test pattern.

The error generator 170 can insert errors into any and all subframes. The errors can be burst errors or evenly distributed through the subframes. The byte locations for the errors, as well as which bits are corrupted, are under control of the user. The error generator 170 allows for software testing, FEC testing, as well as for verification of the user settings and the systems reaction to noise.

Once the errors are detected at the second node receiver, they can be analyzed at the second node, or at a third connected node (not shown). For simplicity however, it will be assumed that analysis is conducted at the first node, where the test pattern was generated. Therefore, the second node includes a second node transmitter 180 having an input connected to the error detector circuit output on line 132, and an output on line 182 to supply the error determination data as the payload in a framed communication. Likewise, a first node receiver 184 has an input on line 182 to receive the framed communication from the second node transmitter 180, and an output on line 186 to supply the error determination data. Alternately, the error determination data can be communicated through an auxiliary communication channel, or through a link that does not frame the payload. An error analyzer 188 has an input connected to the first node receiver output on line 186. The error analyzer 188 analyzes the error determination data for processes selected from the group including forward error correction, noise rejection, and receiver settings.

When enabled, the analyzer 188 analyzes the incoming descrambled payload based on a pattern programmed by the user. It checks each of 16 channels (each of 16 payload bytes in a column) independently for the expected pattern. Every byte in a 16-byte column is expected to have the same pattern. The pattern analyzer logs the number of bit errors encountered in the 'Pattern Analyzer Error Count' register. After a programmable number of payload bits have been counted (as programmed in the 'Pattern Analyzer Total Bit Count' register) the 'Bert Bit Count E' (in the 'Clock and Signal Integrity Event Interrupts' register) interrupt event will be generated and the current error count is transferred to the error count register (Pattern Analyzer Error Count). The software must read the registers before the next interrupt is generated. Otherwise, the count is overwritten. If the error counter reaches its maximum, the counting stops. It will not roll over. Statistics may be gathered on a per row basis or on a summed basis based on the 'Pattern Generator/ Analyzer Control (Decoder and Encoder)' register.

The analyzer 188 complements the pattern generator 114 on the FEC Encode block. The possible patterns are a 16-bit user defined word, $2^7-1$, $2^{15}-1$, $2^{23}-1$, and a $2^{31}-1$ bit long pseudo-random strings. The user selectable patterns are common to both the generator 114 and the analyzer 188.

Figure 4:
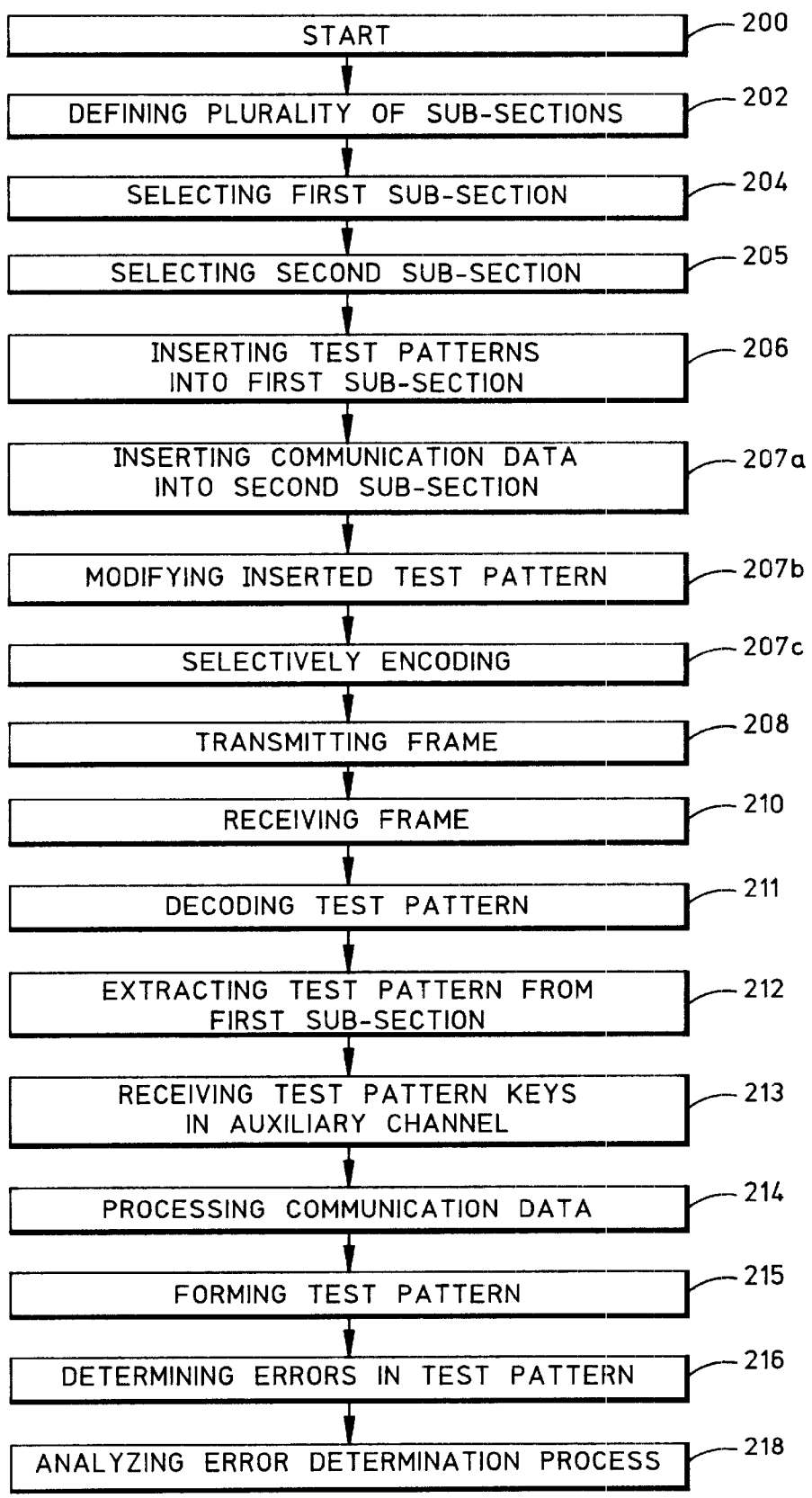
FIG. 4 is a flowchart depicting a method for diagnosing errors in multidimensional digital frame structure communications.

FIG. 4 is a flowchart depicting a method for diagnosing errors in multidimensional digital frame structure communications. Although the method is depicted as a series of numbered steps for clarity, no order should be inferred unless explicitly stated. The method begins with Step 200. Step 202 defines a plurality of sub-sections in each frame. Step 204 selects a first sub-section from the plurality of sub-sections. Step 206 inserts test patterns into the first sub-section. Step 208 transmits the frame. Step 210 receives the frame. Step 212 extracts the test pattern from the first sub-section.

Step 205 selects a second sub-section auxiliary communication channel from the plurality of sub-sections. Step 207a inserts communication data into the second sub-section before transmitting the frame. Step 214 processes the communication data from the second sub-frame after receiving the frame. Step 216 determines errors in the test pattern extracted from the first sub-section in Step 212.

In some aspects of the invention, each frame includes rows with overhead, payload, and forward error correction sections. Defining a first sub-section in Step 202 includes defining a first sub-section with a plurality of payload sections.

In some aspects of the invention, the payload section of each frame row includes a plurality of bytes. Defining a first sub-section in Step 202 includes defining a first sub-section with a plurality of bytes in a row.

Step 207c selectively encodes the test pattern in the first sub-section for forward error correction before transmitting the frame. Step 211, following receiving the frame, decodes the selectively encoded test pattern.

In some aspects, Step 213 receives test pattern keys in an auxiliary communication channel. Step 215 forms the test pattern in response to receiving the test pattern key. Determining errors from the test pattern extracted from the first sub-section in Step 216 includes comparing the extracted test patterns to the formed test pattern.

In some aspects of the invention, forming the test pattern in response to receiving the test pattern key in Step 213 includes retrieving the test pattern from a stored memory. Determining errors in the extracted test patterns in Step 216 includes comparing the extracted test patterns to the stored test pattern.

In some aspects of the invention, forming the test pattern in response to receiving the test pattern key in Step 213 includes generating the test pattern. Determining errors in the extracted test patterns in Step 216 includes comparing the extracted test pattern to the generated test pattern.

In some aspects, the overhead section of the frame includes overhead bytes. Receiving test pattern keys in an auxiliary communication channel in Step 213 includes receiving the pattern key in an overhead byte in the overhead section.

In some aspects, selecting a first sub-section in Step 204 includes selecting a first sub-section with a plurality of rows. Inserting test patterns into the first sub-section in Step 206 includes inserting a plurality of test patterns into the corresponding plurality of first sub-section rows. Extracting the test pattern from the first sub-section in Step 212 includes extracting a test pattern from each of the first sub-section rows. Determining errors in the test pattern extracted from the first sub-section in Step 216 includes determining errors in each row of the first plurality of frame rows.

In some aspects, determining errors in the test pattern extracted from the first sub-section in Step 216 includes determining errors for each test pattern on a row-by-row basis.

In some aspects of the invention, determining errors in the test pattern extracted from the first sub-section in Step 216 includes determining errors for the plurality of test patterns on a frame basis.

Step 207b modifies the inserted test pattern with predetermined errors before transmitting the frame. In some aspects of the invention, modifying the inserted test pattern with predetermined errors in Step 207b includes selectively controlling the location, value, quantity, and distribution of the errors.

Some aspects of the invention include a further step. Step 218 analyzes the error determination process following the determining of errors in the test pattern extracted from the first sub-section. In some aspects of the invention, analyzing the error determination process in Step 218 includes analyzing for processes selected from the group including forward error correction, noise rejection, and receiver settings.

A system and method for in situ performance testing and monitoring have been presented for use in the context of digitally wrapped communications. Specific examples of the invention have been provided as used in a sixteen deep (row), four-frame superframe, however, the invention is not limited to any particular frame structure. Examples have also been given of specific test patterns generation processes and payload placements. Once again, the invention is not limited to any particular test pattern. Likewise, although a process has been disclosed of passing a test pattern key through an auxiliary communication channel, the invention is not necessarily so limited. Other variations and embodiments of the invention will occur to those skilled in the art.

We claim:

1. A method for diagnosing errors in multidimensional digital frame structure communications, the method comprising:

defining a plurality of sub-sections in each frame;

from the plurality of sub-sections, selecting a first sub-section having at least one byte in at least one payload section of at least one frame; and inserting test patterns into the first sub-section.

2. The method of claim 1 further comprising:

transmitting the frame;

receiving the frame; and extracting the test pattern from the first sub-section.

3. The method of claim 2 further comprising:
from the plurality of sub-sections, selecting a second sub-section auxiliary communication channel;
before transmitting the frame, inserting communication data into the second sub-section; and
after receiving the frame, processing the communication data from the second sub-frame.

4. The method of claim 3 further comprising:
determining errors in the test pattern extracted from the first sub-section.

5. The method of claim 4 in which each frame includes rows with overhead, payload, and forward error correction sections;
wherein selecting a first sub-section includes selecting a first sub-section with a plurality of payload sections.

6. The method of claim 5 in which the payload section of each frame row includes a plurality of bytes; and
wherein selecting a first sub-section includes selecting a first sub-section with a plurality of bytes in a row.

7. The method of claim 6 further comprising:
before transmitting the frame, selectively encoding the test pattern in the first subsection for forward error correction;
following receiving the frame, decoding the selectively encoded test pattern.

8. The method of claim 4 further comprising:
receiving test pattern keys in an auxiliary communication channel;
forming the test pattern in response to receiving the test pattern key; and
wherein determining errors from the test pattern extracted from the first sub-section includes comparing the extracted test patterns to the formed test pattern.

9. The method of claim 8 further wherein forming the test pattern in response to receiving the test pattern key includes retrieving the test pattern from a stored memory; and
wherein determining errors in the extracted test patterns includes comparing the extracted test patterns to the stored test pattern.

10. The method of claim 8 further wherein forming the test pattern in response to receiving the test pattern key includes generating the test pattern; and
wherein determining errors in the extracted test patterns includes comparing the extracted test pattern to the generated test pattern.

11. The method of claim 8 in which the overhead section of the frame includes overhead bytes; and
wherein receiving test pattern keys in an auxiliary communication channel includes receiving the test pattern key in an overhead byte in the overhead section.

12. The method of claim 6 wherein selecting a first sub-section includes selecting a first sub-section with a plurality of rows;
wherein inserting test patterns into the first sub-section includes inserting a plurality of test patterns into the corresponding plurality of first sub-section rows;
wherein extracting the test pattern from the first sub-section includes extracting a test pattern from each of the first sub-section rows; and
wherein determining errors in the test pattern extracted from the first sub-section includes determining errors in each row of the first the plurality of frame rows.

13. The method of claim 12 wherein determining errors in the test pattern extracted from the first sub-section includes determining errors for each test pattern on a row-by-row basis.

14. The method of claim 12 wherein determining errors in the test pattern extracted from the first sub-section includes determining errors for the plurality of test patterns on a frame basis.

15. The method of claim 7 further comprising:
before transmitting the frame, modifying the inserted test pattern with predetermined errors.

16. The method of claim 15 wherein modifying the inserted test pattern with predetermined errors includes selectively controlling the location, value, quantity, and distribution of the errors.

17. The method of claim 15 further comprising:
following the determining of errors in the test pattern extracted from the first sub-section, analyzing the error determination process.

18. The method of claim 17 wherein analyzing the error determination process includes analyzing for processes selected from the group including forward error correction, noise rejection, and receiver settings.

19. An integrated circuit (IC) relay device system for diagnosing errors in multidimensional digital frame structure communications, the frame structure including a plurality of frames, the system comprising:
a first node transmitter including:
a frame generator having a first input to accept a payload, and a second input to accept commands for defining a first sub-section from a plurality of sub-sections in each frame, the first sub-section having at least one byte in at least one payload section of at least one frame, the frame generator having a third input to accept a test pattern for insertion into the first sub-section, and an output to supply the frame; and
a pattern generator having an output connected to the frame generator third input to supply the test pattern.

20. The system of claim 19 further comprising:
a second node receiver including:
a frame receiver having a first input to accept the frame from the first node transmitter, a second input to accept commands for defining a first sub-section from a plurality of sub-sections in each frame, a first output to supply the test pattern extracted from the first sub-section, and a second output to provide the payload; and
an error detector having a first input connected to the frame receiver first output, and an output to supply a determination of errors in the extracted test pattern.

21. The system of claim 20 wherein the frame generator second input accepts commands to define a second sub-section from the plurality of sub-sections, and wherein the frame generator has a fourth input to accept communication data for insertion into the second sub-section; and
wherein the frame receiver second input accepts commands to define the second-section, and wherein the frame receiver has a fourth output to supply the communication data extracted from the second sub-section.

22. The system of claim 21 in which each frame includes a plurality of rows, with each row including a payload section; and
wherein the frame generator and frame receiver define a first sub-section as a plurality of row payload sections.

23. The system of claim 21 in which each row payload section includes a plurality of bytes; and
wherein the frame generator and frame receiver accept commands to define a first sub-section as a plurality of bytes in a row payload section.

24. The system of claim 21 wherein the first node transmitter further includes:

an encoder having an input connected to the frame generator output, and an output to supply a frame encoded with forward error protection; and wherein the second node receiver further includes:

a decoder having an input to receive the frame from the first node transmitter and an output connected to the first input of the frame receiver to supply a frame decoded with forward error corrections.

25. The system of claim 24 wherein the first node transmitter further includes:

an encoder bypass system having a first input connected to the frame generator output, a second input to accept bypass commands, and an output to selectively supply frame sub-sections bypassing the encoder in response to the bypass commands; and wherein the second node receiver further includes:

a decoder bypass system having a first input to receive the frame from the first node transmitter, a second input to accept bypass commands, and an output connected to the frame receiver first input to selectively supply frame sub-sections bypassing the decoder in response to the bypass commands.

26. The system of claim 25 wherein the frame generator fourth input accepts test pattern keys for insertion into the second sub-section;

wherein the frame receiver fourth output supplies test pattern keys extracted from the second subsection;

wherein the receiver further includes:

a controller having an input connected to the frame receiver fourth output to accept the tests pattern keys, the controller having an output to supply a formed test pattern; and wherein the error detector has a second input connected to the controller output to accept the formed test pattern, the error detector comparing the formed test pattern to the extracted test pattern to determine errors.

27. The system of claim 26 wherein the controller includes a memory with a plurality of test patterns, the controller accessing a test pattern in memory in response to receiving the test pattern key, to supply the formed test pattern.

28. The system of claim 26 wherein the controller includes a pattern generator, the controller using the generator to generate a test pattern in response to receiving the test pattern key, to supply the formed test pattern.

29. The system of claim 26 wherein the first node transmitter further includes:

an error generator having an input connected to the output of the pattern generator, a second input to accept error commands, and an output connected to the third input of the frame generator to supply a test pattern with predetermined errors.

30. The system of claim 29 wherein the error generator accepts commands to selectively control the location, value, quantity, and distribution of the errors in the test pattern.

31. The system of claim 29 further comprising:

a second node transmitter having an input connected to the error detector circuit output, and an output to supply the error determination data as the payload in a framed communication;

a first node receiver having an input to receive the framed communication from the second node transmitter, and an output to supply the error determination data; and an error analyzer having an input connected to the first node receiver output, the error analyzer analyzing the error determination data for processes selected from the group including forward error correction, noise rejection, and receiver settings.

* * * * *